LONG TIME CONSTANT MONOSTABLE MULTIVIBRATOR
Filed Dec. 2, 1964
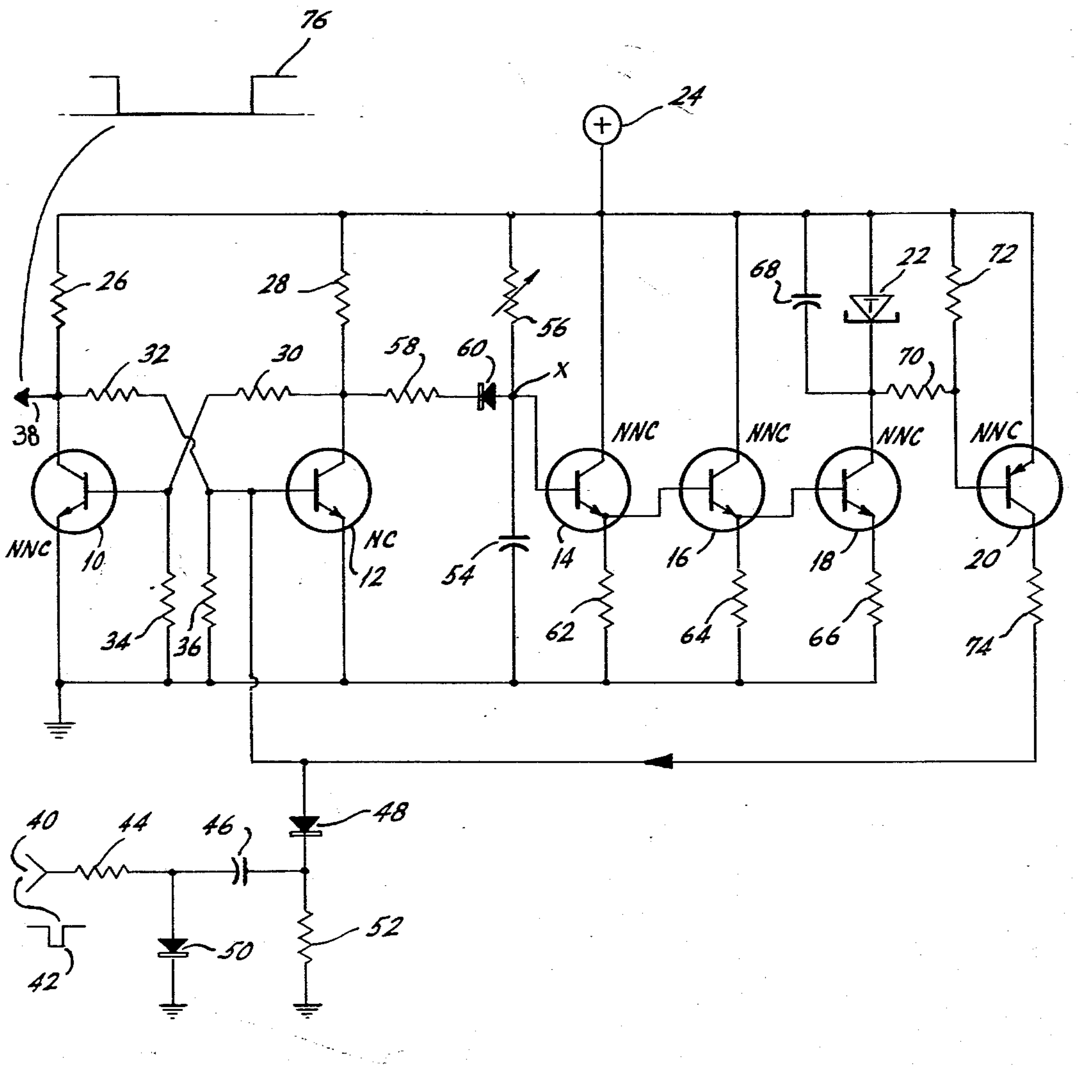
INVENTOR.
JOSEPH F. SPRINGER, JR.
BY
D A Pressman
ATTORNEY United States Patent Office 3,355,599

Patented Nov. 28, 1967

3,355,599

LONG TIME CONSTANT MONOSTABLE MULTIVIBRATOR

Joseph F. Springer, Jr., Philadelphia, Pa., assignor to Philco-Ford Corporation, a corporation of Delaware Filed Dec. 2, 1964, Ser. No. 415,313
12 Claims. (Cl. 307—88.5)

ABSTRACT OF THE DISCLOSURE

A long time constant monostable multivibrator comprising a flip flop which enables a charging circuit when set by an input pulse and a tunnel diode trigger circuit which resets the flip flop when the charging circuit voltage reaches a predetermined value.

The present invention relates to timing and pulse stretching circuitry and more particularly to an adjustable monostable multivibrator having a very long quasi-stable period which may be controlled with great accuracy.

A monostable multivibrator (sometimes called a one shot) is a circuit which frequently is used to provide an output pulse having a time width greater than the width of an input pulse or to provide an output pulse having a predetermined duration. Monostable multivibrators generally take the form of two cross-coupled inverters, the output of the first being DC-coupled to the input of the second, and the output of the second being capacitively-coupled to the input of the first. These multivibrators have been used extensively in many types of electronic equipment, and accordingly it is not necessary to detail their operation here.

A principal disadvantage of the aforenoted type of monostable multivibrator is its lack of accuracy in timing and its inability to provide a relatively long duration output pulse (i.e., one of from several seconds to several minutes duration). Since the cross-coupled multivibrator operates by charging or discharging a capacitor until the voltage thereacross is sufficient to trigger an inverter, such multivibrators are inherently subject to inaccuracies due to the fact that most inverters do not have a sharply defined triggering or threshold point. For instance, in the case of a transistor inverter, wherein the transistor becomes conductive when its base-emitter junction is forward biased, it is usually found that, with a fixed emitter potential, the conduction point may vary over several tenths of a volt in the base voltage range. Furthermore the aforenoted cross-coupled type of monostable multivibrator is not capable of providing long duration output pulses due to the fact that circuit parameters required to time an extended interval (i.e., a large capacitor and/or a large resistor) are not compatible with most transistor inverter circuitry.

*Objects*

Accordingly several objects of the present invention are:

(1) to provide a new and improved monostable multivibrator, pulse stretcher, or timer;

(2) to provide a monostable multivibrator having a high timing accuracy; and (3) to provide a monostable multivibrator which is capable of timing a very long interval or providing a very long duration output pulse.

Other objects and advantages of the present invention will become apparent from a consideration of the ensuing description thereof.

*Summary*

According to the present invention, a monostable multivibrator is comprised of a flip flop, a timing circuit, a high input impedance amplifier, and a tunnel diode trigger. Initial setting of the flip flop actuates the timing circuit which provides a slowly increasing voltage at the input of the high impedance amplifier. A corresponding varying voltage appears at the output of the amplifier and when it exceeds the threshold level of the tunnel diode trigger, an output signal is provided by the trigger circuit which is fed back to reset the flip flop.

*Drawings*

A circuit according to the present invention is shown in the single figure of drawing.

*Description of circuit*

The circuit of the invention includes six transistors: 10, 12, 14, 16, 18, and 20. Transistors 10 and 12 are cross-coupled to form a bistable circuit or flip flop. Transistors 14, 16, and 18 are connected in a cascade arrangement to form a high input impedance amplifier. Transistor 20 is arranged to sense the voltage across a tunnel diode 22 and control the operation of the flip flop.

In the flip flop, the emitters of transistors 10 and 12 are connected to ground or a point at reference potential. The collectors are connected to a positive potential source 24 via collector resistors 26 and 28, respectively. The collector of transistor 12 is connected to the base of transistor 10 via resistor 30 and the collector of transistor 10 is connected to the base of transistor 12 via resistor 32. The bases of transistors 10 and 12 are connected to ground via resistors 34 and 36, respectively. An output connection or terminal 38 is provided at the collector of transistor 10.

An input terminal 40 is arranged to receive a negative trigger pulse as shown at 42. Connected between input terminal 40 and the base of transistor 12 is a current limiting resistor 44, a differentiating capacitor 46, which is used to prevent long trigger pulses from reaching the base of transistor 12, and a diode 48. The junction of resistor 44 and capacitor 46 is connected to ground by diode 50, and the junction of capacitor 46 and diode 48 is connected to ground a resistor 52. Diodes 50 and 48 prevent positive input pulses from reaching the circuit of the invention and resistor 52 forms part of the load circuit of transistor 20.

Transistor 10 is normally nonconducting (NNC) and transistor 12 is normally conducting (NC), as indicated.

The collector of transistor 12 is also connected, via resistor 58 and diode 60, to a capacitive charging circuit including capacitor 54 and adjustable resistor 56. Capacitor 54 and resistor 56 are connected in series across source 24 and ground. The junction of capacitor 54 and resistor 56 will be referred to as point X. Resistor 56 is suitably adjusted to control the time duration of the output pulse generated by the circuit of the invention.

The base of transistor 14, which constitutes the input of a high input impedance amplifier, is connected to point X. Transistor 14 should be one which has a low collector leakage current. The emitter resistor thereof, 62, should have a very high value. The emitter of transistor 14 is connected to the base of transistor 16. The emitter of transistor 16 is connected to ground via resistor 64, which has a lower resistance than resistor 62, and the collector of transistor 16 is connected to source 24. The emitter of transistor 16 is also connected to the base of transistor 18. The emitter of transistor 18 is connected to ground by resistor 66 and the collector thereof is connected to source 24 by a tunnel diode 22 which is paralleled by a transient-bypass capacitor 68.

Tunnel diode 22 is designed to remain in its low impedance, low voltage state until transistor 18 draws sufficient current to switch tunnel diode 22 to its high impedance, high voltage state. The collector of transistor 18 is connected to the base of transistor 20 by resistor 70, and the base of transistor 20 is also connected to source 24 by resistor 72 which maintains transistor 20 normally nonconductive (NNC). The emitter of transistor 20 is connected to source 24 and the collector thereof is connected to ground via resistor 74, diode 48, and resistor 52. The junction of resistor 74 and diode 48 is connected back to the base of transistor 12.

*Operation of circuit.—Quiescent state*

In the quiescent or ready state of the circuit, transistor 12 in conducting and its collector is at ground potential. Transistor 10 is nonconductive so that output terminal 38 is at the potential of source 24. Since the forward impedance of diode 60 and resistor 58 are designed to be much smaller than the resistance of resistor 56, point X is also substantially at ground potential. Accordingly capacitor 54 is substantially discharged, and the base of transistor 14 is also substantially at ground. Transistors 14 and 16 are thus nonconductive and the input to the base of transistor 18 is also at ground. Accordingly transistor 18 is also nonconductive. No current flows through tunnel diode 22, and consequently the collector of transistor 18 is at the same potential as that of source 24. Transistor 20 is thus also maintained nonconductive.

*Active state*

To activate the circuit, a negative input pulse is applied at input terminal 40. This input is conducted to the base of transistor 12 to immediately render transistor 12 nonconductive. Due to conventional flip flop action, transistor 10 is rendered conductive. Accordingly the potential at the collector of transistor 10 and output terminal 38 will go abruptly to ground as shown in output waveform 76. The collector potential of transistor 12 will rise to that of source 24, back-biasing diode 60. Capacitor 54 will then begin to charge through resistor 56, and thus the potential of point X will begin to rise slowly from a point slightly above ground potential toward that of source 24. This rise in potential will cause transistor 14 to conduct, producing a corresponding rise at the emitter of transistor 14 and in turn at the emitter of transistor 16 and the base of transistor 18.

As the base potential of transistor 18, rises, transistor 18 will begin to conduct current from source 24 through tunnel diode 22. Eventually the current through tunnel diode 22 will equal the forward peak current value thereof. The time in which this takes to occur can be adjusted to any desired value from several seconds to several minutes by properly selecting the value of capacitor 54 and adjusting the value resistor 56. At the instant when the current through tunnel diode 22 tends to exceed the forward peak current value thereof, tunnel diode 22 will switch rapidly to its high impedance, high voltage state. The voltage at the collector of transistor 18 will fall abruptly to a value sufficient to render transistor 20 conductive.

When transistor 20 conducts current will be drawn through resistor 74 and diode 48, causing the potential at the base of transistor 12 to rise abruptly to a value sufficient to return transistor 12 to its normally conductive state. Through flip flop action, transistor 10 will again be rendered non-conductive and the voltage at point 38 will rise to the value of source 24, terminating the negative step in output waveform 76. Capacitor 54 will be discharged through diode 60, resistor 58, and transistor 12. The voltage at point X will fall to ground. This fall in potential will be seen at the base of transistor 18, terminating conduction thereof. Transistor 20 will be returned to its normally noncouductive state.

It will be noted that the circuit operation is such that input waveform 42 is stretched to produce output waveform 76 which has any desired duration from several seconds to several minutes. The timing of output waveform 76 may be very consistently and precisely controlled due to the very sharp switching characteristic of tunnel diode 22.

It will be apparent that if a positive-going output waveform is desired instead of waveform 76, the output connection should be made to the collector of transistor 12.

Typical values or identifications of the circuit components are as follows:

| | |
|---|---|
| Transistors: | |
| 10, 12, 14, 16, and 18 | 2N708 (NPN) |
| 20 | 2N964 (PNP) |
| Resistors: | |
| 26, 28 | 1K |
| 30, 32, 34, 36, 70, 72, 74 | 10K |
| 58 | 100 |
| 44 | 1K |
| 52 | 1K |
| 56 | 1M |
| 62 | 120K |
| 66 | 4.7K |
| Diodes: | |
| 48 | 1N194 |
| 50 | 1N194 |
| 60 | 1N277 |
| 22 | [1] 1N3712 |
| Capacitors: | |
| 46 | μf .1 |
| 54 | μf 50 |
| 68 | μf 0.001 |

[1] 1 ma forward peak current.

While there has been described what is at present considered to be the preferred embodiment of the invention it will be apparent that various modifications and other embodiments thereof will occur to those skilled in the art within the scope of the invention. Accordingly, it is desired that the scope of the invention be limited by the appended claims only.

I claim:

1. In combination:
(a) a bistable circuit,
(b) a capacitor,
(c) a tunnel diode,
(d) means coupled to said bistable circuit and said capacitor for gradually charging said capacitor when said bistable circuit is in one of its stable states and for rapidly discharging said capacitor when said bistable circuit is in the other of its stable states,
(e) means coupled to said capacitor and said tunnel diode for maintaining said tunnel diode in one of its voltage states when the charge on said capacitor is below a predetermined level and in the other of its voltage states when the charge on said capacitor is above a predetermined level, and
(f) means coupling said tunnel diode to said bistable circuit for changing the state of said bistable circuit when said tunnel diode switches from one of its voltage states to the other.

2. The combination of claim 1 wherein said means of clause (d) comprises a resistor connecting said capacitor in circuit with a voltage source and a diode connecting the junction of said capacitor and resistor to an output terminal of said bistable circuit.

3. The combination of claim 1 wherein said means of clause (e) comprises a variable impedance device connecting said tunnel diode in series with a voltage source, the impedance of said device being controlled by the voltage across said capacitor.

4. The invention of claim 3 wherein said variable impedance device is a transistor, the base of which is connected to one terminal of said capacitor by at least one emitter follower amplifier.

5. In combination:
(a) a bistable circuit,
(b) a capacitor and means connected to said bistable circuit for charging said capacitor when said bistable circuit is in one state and discharging said capacitor when said bistable circuit is in another state, (c) a voltage source, a controllable impedance device, and a tunnel diode connected in a circuit, the impedance of said device being controlled by the voltage across said capacitor, and
(d) means coupled to said bistable circuit and responsive to the voltage across said tunnel diode, for changing the state of said bistable circuit when the voltage state of said tunnel diode changes.

6. The combination of claim 5 wherein said bistable circuit comprises a pair of cross-coupled transistor inverters and said means for charging said capacitor includes a resistor connecting said capacitor in series with a voltage source and a diode connecting the junction of said resistor and capacitor to an output terminal of one of said inverters.

7. The combination of claim 5 wherein said controllable impedance device comprises a transistor, and at least one emitter follower amplifier, the collector and emitter of said transistor being connected in said circuit with said tunnel diode and said voltage source, the base of said transistor being connected to the output of said one emitter follower amplifier, and means coupling the input of said amplifier across said capacitor.

8. The combination of claim 5 wherein said means of clause (d) comprises a transistor amplifier the input of which is connected across said tunnel diode and the output of which is connected to an input of one of said inverters.

9. A monostable multivibrator, comprising, in combination:
(a) a voltage source,
(b) a capacitor and a resistor connected in a circuit with said source,
(c) a flip-flop comprising two cross coupled transistor inverters connected to said source,
(d) a diode connecting the collector of one transistor of said flip-flop to the junction of said capacitor and resistor, said diode poled so that when said one transistor is conducting said capacitor will be discharged through said diode and said transistor, and when said one transistor is nonconducting said diode will be reverse biased to allow said capacitor to be charged through said resistor, and
(e) means for rendering said one transistor nonconductive when the voltage across said capacitor reaches a predetermined value, said means comprising: (1) a tunnel diode, (2) means for changing the voltage state of said tunnel diode when the voltage across said capacitor reaches said predetermined value, and (3) means for rendering said one transistor conductive in response to a change in the voltage state of said tunnel diode.

10. A monostable multivibrator comprising, in combination:
(a) a capacitive charging circuit including a capacitor, a charging impedance, and a voltage source connected in a circuit,
(b) a tunnel diode and a variable impedance device connected in a circuit across a voltage source, the impedance of said device being controlled by the voltage across the said capacitor, and
(c) means, connected to said tunnel diode and having an input terminal, for allowing said capacitor to charge when a signal is applied to said input terminal, and for discharging said capacitor when the voltage state of said tunnel diode changes.

11. The multivibrator of claim 10 wherein said means of clause (c) comprises a bistable multivibrator having an output terminal connected to the junction of said capacitor and said charging impedance via a diode.

12. A monostable multivibrator for providing a long output pulse of precisely consistent duration in response to an input trigger pulse, comprising, in combination:
(a) a bistable multivibrator comprising two cross-coupled transistor inverters, at least one of which has an emitter connected to a reference potential point and a collector connected to a voltage source via a resistor,
(b) a capacitor having one terminal connected to said reference point,
(c) a variable resistor connected between the other terminal of said capacitor and said source,
(d) a diode connected between said other terminal of said capacitor and the collector of said one transistor,
(e) a transistor having an emitter connected to said reference point via a resistor, a base connected to said other terminal of said capacitor via a buffer amplifier, and a collector connected to said source via a tunnel diode, such that when the voltage across said capacitor reaches a predetermined value, the collector to base impedance of said transistor will be sufficiently low to cause said tunnel diode to assume its high voltage state, and
(f) an inverter amplifier having an input arranged to sense the voltage across said tunnel diode and an output arranged to drive the base of said one transistor.

References Cited

UNITED STATES PATENTS

| | | | |
|---|---|---|---|
| 3,049,625 | 8/1962 | Brockman | 307—88.5 |
| 3,085,165 | 4/1963 | Schaffert et al. | 307—88.5 |
| 3,125,730 | 3/1964 | Levy et al. | 307—88.5 X |
| 3,225,221 | 12/1965 | Scott | 307—88.5 |

ARTHUR GAUSS, *Primary Examiner.*

D. D. FORRER, *Assistant Examiner.*